(12) United States Patent
Cheung

(10) Patent No.: US 11,985,182 B2
(45) Date of Patent: May 14, 2024

(54) METHOD FOR PERFORMING SETTING CONTROL FOR A PLURALITY OF DEVICES THROUGH A WEB UI AND APPARATUS FOR SUPPORTING THE SAME

(71) Applicant: HANWHA TECHWIN CO., LTD., Seongnam-si (KR)

(72) Inventor: Sweungwon Cheung, Seongnam-si (KR)

(73) Assignee: Hanwha Vision Co., Ltd., Seongnam-si (KR)

( * ) Notice: Subject to any disclaimer, the term of this patent is extended or adjusted under 35 U.S.C. 154(b) by 0 days.

(21) Appl. No.: 17/838,259

(22) Filed: Jun. 13, 2022

(65) Prior Publication Data
US 2022/0407908 A1    Dec. 22, 2022

(30) Foreign Application Priority Data

Jun. 14, 2021 (KR) .......... 10-2021-0076517

(51) Int. Cl.
| | |
|---|---|
| *H04L 67/025* | (2022.01) |
| *G06F 9/445* | (2018.01) |
| *G06F 9/451* | (2018.01) |
| *G06F 9/54* | (2006.01) |
| *H04L 9/40* | (2022.01) |
| *H04L 67/02* | (2022.01) |
| *H04L 67/125* | (2022.01) |
| *H04L 67/51* | (2022.01) |

(Continued)

(52) U.S. Cl.
CPC ........ *H04L 67/025* (2013.01); *G06F 9/44505* (2013.01); *G06F 9/451* (2018.02); *G06F 9/547* (2013.01); *H04L 63/08* (2013.01); *H04L 67/02* (2013.01); *H04L 67/125* (2013.01); *H04L 67/51* (2022.05); *H04N 21/4782* (2013.01); *H04N 21/485* (2013.01); *H04N 23/661* (2023.01)

(58) Field of Classification Search
CPC ...... G06F 9/44505; G06F 9/451; G06F 9/547; H04L 63/08; H04L 67/02; H04L 67/025; H04L 67/125; H04N 23/661
See application file for complete search history.

(56) References Cited

U.S. PATENT DOCUMENTS

| | | | |
|---|---|---|---|
| 11,467,726 B2 * | 10/2022 | Lindholm | .......... H04N 21/4532 |
| 2013/0222601 A1 * | 8/2013 | Engstrom | .............. H04N 5/265 |
| | | | 348/159 |

(Continued)

*Primary Examiner* — Thomas J Dailey
(74) *Attorney, Agent, or Firm* — McLean IP Global; Jason Y. Pahng

(57) ABSTRACT

A method including: requesting a web resource from a plurality of devices for setting a web UI for the plurality of devices; receiving the web resource from the plurality of devices; requesting device attribute information related to a device attribute from the plurality of devices; receiving the device attribute information from the plurality of devices; checking whether a web resource corresponding to the received device attribute information is stored in a memory of the server; configuring a common setting web UI for a common device attribute and configuring an individual setting web UI for an individual device attribute based on the web resource; and mashing up the common setting web UI and the individual setting web UI and rendering the mashed common setting web UI and individual setting web UI to a single web page of the server.

10 Claims, 11 Drawing Sheets

(51) Int. Cl.
*H04N 21/4782* (2011.01)
*H04N 21/485* (2011.01)
*H04N 23/661* (2023.01)

(56) References Cited

U.S. PATENT DOCUMENTS

| | | | |
|---|---|---|---|
| 2014/0245148 A1* | 8/2014 | Silva | H04M 1/72412 |
| | | | 715/719 |
| 2015/0181265 A1* | 6/2015 | Clavenna | H04N 21/2187 |
| | | | 348/159 |
| 2016/0119572 A1* | 4/2016 | Slupik | H04N 7/0122 |
| | | | 348/445 |
| 2020/0275516 A1* | 8/2020 | Otaka | H04W 76/27 |

* cited by examiner

METHOD FOR PERFORMING SETTING CONTROL FOR A PLURALITY OF DEVICES THROUGH A WEB UI AND APPARATUS FOR SUPPORTING THE SAME

CROSS-REFERENCE TO RELATED APPLICATIONS

This application claims the benefit of Korean patent application no. 10-2021-0076517 filed on Jun. 14, 2021, which is incorporated herein by reference for all purposes as if fully set forth herein.

TECHNICAL FIELD

The present disclosure relates to a method for performing setting control for a plurality of devices, and more particularly, to a method for performing setting control for a plurality of devices through a web UI and an apparatus for supporting the same.

BACKGROUND

In the case of an existing video surveillance system, in order to control or manage a setting of each surveillance camera, a server web browser accesses each surveillance camera through a web UI set for each surveillance camera and performs setting on each surveillance camera individually.

That is, there was an inconvenience in that the server had to access a setting page for each surveillance camera and perform individual setting for each surveillance camera in order to set functions of a plurality of surveillance cameras. Therefore, in order to solve the inconvenience of accessing the setting page set for each surveillance camera and individually setting each surveillance camera, a configuration file was stored by using a function of a configuration file backup, and thereafter, setting for surveillance cameras was collectively applied.

However, this method also has the inconvenience of having to access a web UI setting page of each surveillance camera and upload the setting for each surveillance camera, separately.

SUMMARY

The present disclosure provides a method for controlling setting for a plurality of devices by single setting regarding a common device attribute by configuring a common configuration web UI and an individual configuration web UI in a single web page of a server web browser or a web page application.

The technical problems to be achieved in the present disclosure are not limited to the technical problems mentioned above, and other technical problems not mentioned will be clearly understood by those skilled in the art to which the present disclosure pertains from the description below.

In an aspect, a method for performing setting control for a plurality of devices through a web UI of a server is provided. More specifically, the method performed by the server may include: requesting a web resource from the plurality of devices for setting a web UI for the plurality of devices; receiving the web resource from the plurality of devices; requesting device attribute information related to a device attribute from the plurality of devices; receiving the device attribute information from the plurality of devices; checking whether a web resource corresponding to the received device attribute information is stored in a memory of the server; configuring a common setting web UI for a common device attribute and configuring an individual setting web UI for an individual device attribute based on the web resource; and mashing up the common setting web UI and the individual setting web UI and rendering the mashed common setting web UI and individual setting web UI to a single web page of the server.

In addition, the method may further include: requesting a web resource corresponding to the received device attribute information from a device having the received device attribute information when the web resource corresponding to the received device attribute information is not stored in the memory of the server as a result of checking; and receiving the requested web resource from the device having the received device attribute information.

In addition, in the present disclosure, a format of the received device attribute information may be xml, and a format of the web resource may be hypertext markup language (HTML), cascading style sheets (CSS), or JavaScript (JS).

In addition, in the present disclosure, the method may further include performing an authentication procedure with the plurality of devices.

In addition, in the present disclosure, the plurality of devices may be a plurality of surveillance cameras.

Also, in the present disclosure, the device attribute may include at least one of a video setting, a zoom setting, a PTZ setting, and a detection setting.

In addition, in the present disclosure, the plurality of devices may be IoT devices.

In another aspect, a server for performing setting control for a plurality of devices includes: a wireless communication unit transmitting and receiving wireless signals; a memory; output unit; and a controller functionally connected to the wireless communication unit, the memory and the output unit, wherein the controller controls the wireless communication unit to request a web resource from the plurality of devices for web UI setting regarding the plurality of devices and receive the web resource from the plurality of devices, controls the wireless communication unit to request device attribute information related to a device attribute from the plurality of devices and receive the device attribute information from the plurality of devices, checks whether a web resource corresponding to the received device attribute information is stored in a memory of the server, configures a common setting web UI for a common device attribute and an individual setting web UI for an individual device attribute based on the web resource, and controls the output unit to mesh up the common setting web UI and the individual setting web UI and render to a single web page of the server.

In addition, in the present disclosure, when the web resource corresponding to the received device attribute information is not stored in the memory of the server, the controller may request a web resource corresponding to the received device attribute information from a device having the received device attribute information and may control the wireless communication unit to receive the requested web resource from the device having the received device attribute information.

Advantageous Effects

In the present disclosure, a setting for multiple devices may be controlled by one setting for a common device attribute by configuring a common setting web UI and an individual setting web UI in a single web page or web page application of a server web browser.

The effects obtainable in the present disclosure are not limited to the above-mentioned effects, and other effects not mentioned may be clearly understood by those skilled in the art to which the present disclosure pertains from the following description.

BRIEF DESCRIPTION OF THE DRAWINGS

The accompanying drawings, which are included as a part of the detailed description to facilitate the understanding of the present disclosure, provide embodiments of the present disclosure and describes the technical features of the present disclosure together with the detailed description.

DETAILED DESCRIPTION

Technical terms used in the present disclosure are used to merely illustrate specific embodiments, and should be understood that they are not intended to limit the present disclosure. As far as not being defined differently, all terms used herein including technical or scientific terms may have the same meaning as those generally understood by an ordinary person skilled in the art to which the present disclosure belongs to, and should not be construed in an excessively comprehensive meaning or an excessively restricted meaning. In addition, if a technical term used in the description of the present disclosure is an erroneous term that fails to clearly express the idea of the present disclosure, it should be replaced by a technical term that may be properly understood by the skilled person in the art. In addition, general terms used in the description of the present disclosure should be construed according to definitions in dictionaries or according to its front or rear context, and should not be construed to have an excessively restrained meaning.

It will be understood that, although the terms first, second, etc. May be used herein to describe various elements, these elements should not be limited by these terms. These terms are only used to distinguish one element from another. For example, a first element could be termed a second element, and, similarly, a second element could be termed a first element, without departing from the scope of the present disclosure.

Embodiments of the present disclosure will be described below in detail with reference to the accompanying drawings where those components are rendered the same reference number that are the same or are in correspondence, regardless of the figure number, and redundant explanations are omitted.

In describing the present disclosure, if a detailed explanation for a related known function or construction is considered to unnecessarily divert the gist of the present disclosure, such explanation has been omitted but would be understood by those skilled in the art. The accompanying drawings are used to help easily understood the technical idea of the present disclosure and it should be understood that the idea of the present disclosure is not limited by the accompanying drawings. The idea of the present disclosure should be construed to extend to any alterations, equivalents and substitutes besides the accompanying drawings.

Figure 1:
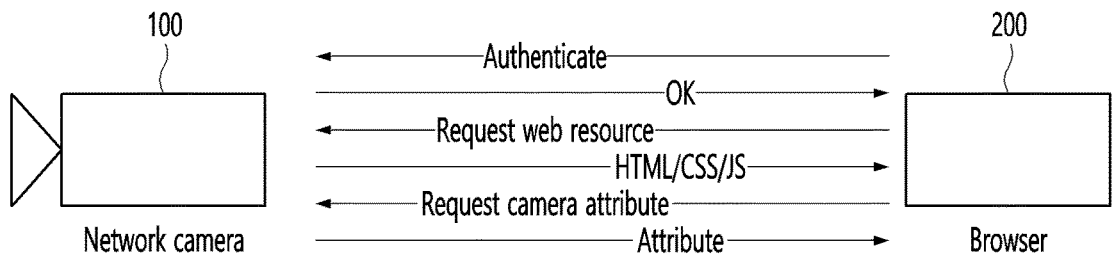
FIG. 1 is a flowchart illustrating an example of a method for setting a web UI in a server web browser in relation to setting control of a surveillance camera in a video surveillance system.

FIG. 1 is a flowchart illustrating an example of a method for setting a web UI in a server web browser in relation to setting control of a surveillance camera in a video surveillance system.

A method for setting a web UI for an existing surveillance camera in a server web browser will be described in more detail with reference to FIG. 1.

First, a surveillance camera (or network camera or video camera) performs an authentication procedure with a server.

More specifically, the server transmits an authentication request message for requesting authentication to the surveillance camera to perform authentication with the surveillance camera.

Also, the server receives a response to the authentication request message from the surveillance camera. The response may include information indicating acceptance or rejection of the authentication request. For example, acceptance of the authentication request may be expressed as 'OK', and rejection of the authentication request may be expressed as 'Reject'.

Also, the server requests a UI Web resource from the surveillance camera to configure a web UI for the surveillance camera.

Also, the surveillance camera provides a UI Web resource in the form of Hypertext Markup Language (HTML), cascading style sheets (CSS) or JavaScript (JS) in response to the requested UI Web resource.

Also, the server requests a camera attribute in order to request information on the camera attribute from the surveillance camera.

Also, the surveillance camera transmits a response to the camera attribute request to the server. In this case, a format of the response to the camera attribute request may be xml.

Figure 2:
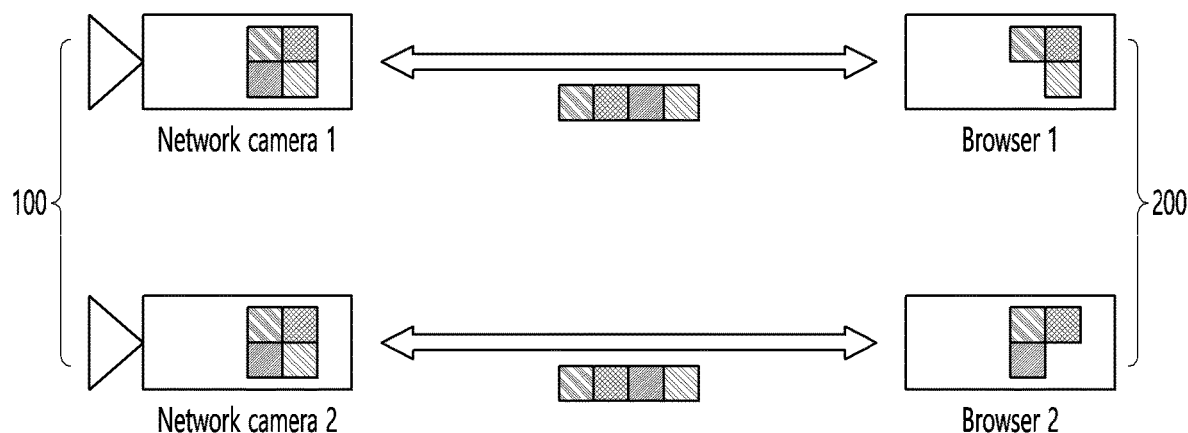
FIG. 2 is a diagram illustrating an example of a method for setting a web UI of a surveillance camera in a video surveillance system.
Figure 2:
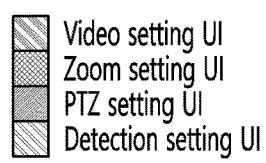

FIG. 2 is a diagram illustrating an example of a method for setting a web UI of a surveillance camera in a video surveillance system.

That is, FIG. 2 illustrates a screen in which a method for setting a web UI of the surveillance camera and the set web UI are expressed in a web browser of the server. In the existing case, the web UI setting for a plurality of surveillance cameras is individually performed in the web browser of the server corresponding to each surveillance camera.

Web UI related web resources (HTML, CSS, Java Script, etc.) of the surveillance camera are ported to the surveillance camera, and when a user accesses the surveillance camera through a web browser of the server, the surveillance camera transmits information on a UI web resource and camera attribute in an xml format. Table 1 below illustrates an example of information included in the camera attribute according to the type of surveillance camera.

The server web browser outputs a UI corresponding to an item in which "presence (or true)" is set or displayed according to the attribute received from the surveillance camera, and does not output a UI corresponding to an item in which "none (or false)" is set or displayed.

TABLE 1

| | Type of surveillance camera | | |
|---|---|---|---|
| | XNB-6000 | XNV-6080 | XNP-6320 |
| Focus control | manual | manual | Manual/auto |
| Focal length | X | 2.8~12 mm | 4.4~140 mm |
| Zoom magnification | X | 4.3x | 32x |
| PTZ | X | X | ○ (Pan angle/velocity, Tilt angle/velocity, preset number: 255) |
| Digital zoom | X | X | 16x |
| WDR | ○ | ○ | ○ |
| IR LED installed | X | X | ○ |
| Tempering detected | ○ | ○ | ○ |
| Face detected | ○ | ○ | ○ |
| Audio detected | ○ | ○ | ○ |
| Memory card | ○ | ○ | ○ |
| Alarm in/out | One for each | One for each | In: 3, Out: 4 |
| Chrome encoding | X | X | |

First Embodiment

Hereinafter, a method for performing a Web UI setting for a plurality of surveillance cameras proposed in the present disclosure in one page of a server web browser will be described.

The method proposed in the present disclosure may be equally applied to a method for a web UI for IoT devices of home, factories, and companies, as well as for a surveillance camera of video monitoring system. A specific method in which the method proposed in the present disclosure is applied to an IoT device will be described later.

That is, the method proposed in the present disclosure is also applied to IoT devices such as a smart home and IoT system, and the surveillance camera may be installed in an automatic checkout counter (ACO) or an unmanned store, and the method proposed in the present disclosure may be applied.

A common camera attribute among the camera attributes or functions of a plurality of surveillance cameras is performing a common setting to request a web resource for a web UI configuration in a server web browser for a corresponding camera attribute through any one of a plurality of surveillance cameras, performing an individual setting to request a UI web resource to configure a web UI in the server web browser from each surveillance camera having different attributes among camera attributes of the plurality of surveillance cameras, mashing up a UI web browser received through the common setting and individual setting, rendering the same to one page of the server web browser, and outputting the same.

Through this, the user may easily control a setting for a plurality of surveillance cameras in one page of the server web browser.

More specifically, in order to perform the method proposed in the present disclosure as described above, when the server does not store a corresponding UI web resource among the camera attributes received from the surveillance camera, the server requests and receives the UI web resource from the surveillance camera.

Here, when the server requests a UI web resource from a plurality of surveillance cameras, a common setting and an individual setting process for the web UI may be applied as described above.

That is, when there are a plurality of surveillance cameras to request the same UI web resource for the camera attribute, the server may request a UI web resource from any one of the surveillance cameras to request the UI web resource, and, if there is no surveillance camera to request the same UI web resource and different UI web resources are to be requested from each surveillance camera, the server may request a UI web resource corresponding to a camera attribute of each surveillance camera from each surveillance camera.

Hereinafter, a method for setting a web UI for a plurality of surveillance cameras in one page of a server web browser proposed in the present disclosure will be described in more detail with reference to the related drawings.

First, the server is connected to a plurality of surveillance cameras through an authentication procedure.

The server requests and receives a UI web resource from each surveillance camera.

Then, the server requests information on the camera attribute or function of each of the plurality of surveillance cameras.

Also, the server receives information on the attribute or functions of the camera from each surveillance camera. Here, the attribute information on the surveillance camera may be provided in the form of xml, and the server may store the attribute.xml as HTT, CSS, JS, or the like.

In addition, the server distinguishes between common camera attributes and different individual camera attributes for each surveillance camera with respect to the camera attributes received from each surveillance camera.

In addition, the server performs common web UI setting for surveillance cameras having common camera attributes with respect to common camera attributes, and performs individual web UI setting for each surveillance camera with respect to each surveillance camera having individual camera attributes.

That is, in a more specific process of performing a common setting, the server checks whether a UI web resource corresponding to the common camera attribute is stored in the memory of the server, and if it is stored in the memory, the server configures a web UI for surveillance cameras having the common camera attribute.

If the UI web resource corresponding to the common camera attribute is not stored in the memory, the server requests and receives a UI web resource corresponding to the common camera attribute from any one of the surveillance cameras having the common camera attribute and configure a web UI for the surveillance cameras having the common camera attribute.

Here, the one surveillance camera may be a camera first connected to the server or a preset surveillance camera.

Also, in a more specific process of performing an individual setting, the server checks whether the UI web resource corresponding to different camera attributes is stored in the memory, and if the UI web resource is stored in the memory, the server configures a web UI for each of the surveillance cameras having different camera attributes.

If the UI web resource corresponding to different camera attributes is not stored in the memory, the server requests and receives a UI web resource corresponding to the different camera attributes from each surveillance camera having different camera attributes and configure an individual web UI for each surveillance camera having the different camera attributes.

Thereafter, the server mashes up the web UI configured through the common setting and the web UI configured through the individual setting, renders them to the web browser of the server, and outputs the same.

In addition, the server may conveniently perform a setting for a plurality of surveillance cameras through a setting screen displayed on one page of a web browser.

Figure 3:
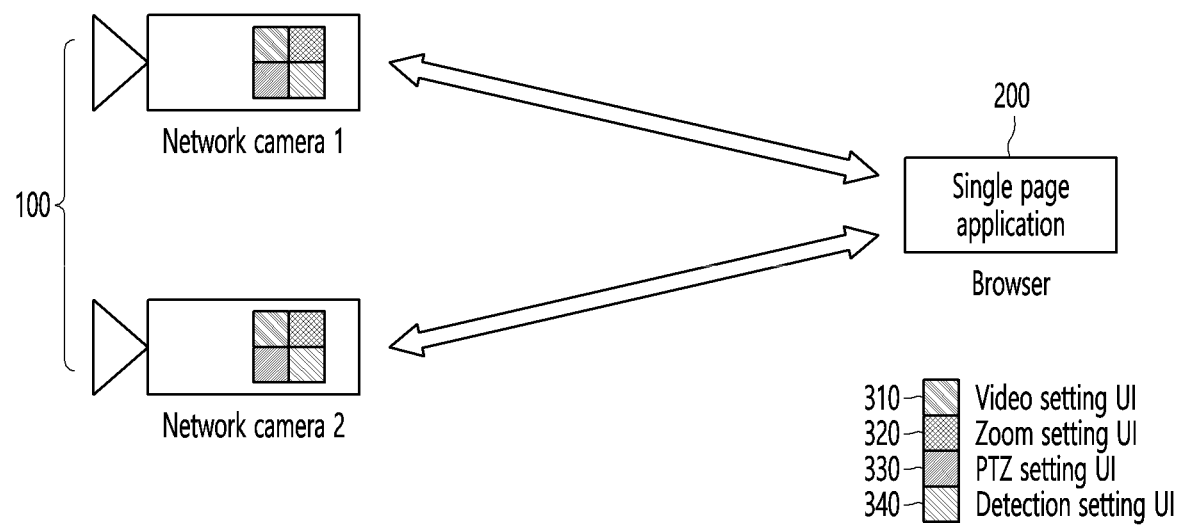
FIG. 3 is a conceptual diagram illustrating an example of a method for performing a web UI setting for a plurality of surveillance cameras through one setting page of a server web browser proposed in the present disclosure.

FIG. 3 is a conceptual diagram illustrating an example of a method for performing a web UI setting for a plurality of surveillance cameras through one setting page of a server web browser proposed in the present disclosure.

Referring to FIG. 3, it is assumed that the surveillance camera (or network camera) 1 and the surveillance camera 2 are connected to the server and the server has successfully performed authentication with the surveillance camera 1 and the surveillance camera 2. The server may control and manage a setting for the surveillance camera 1 and the surveillance camera 2 through a single page of a web browser or a single page application (SPA).

That is, the server configures UI web resources (video setting UI, zoom setting UI, PTZ setting UI, detection setting UI) for camera attributes of surveillance camera 1 and surveillance camera 2 through a single page or single page application of a web browser and control and manage a setting for surveillance camera 1 and surveillance camera 2 in common.

Video setting UI 310, zoom setting UI 320, PTZ setting UI 330, and detection setting UI 340 of FIG. 3 correspond to the camera attribute set in common to the surveillance camera 1 and the surveillance camera 2.

Figure 4:
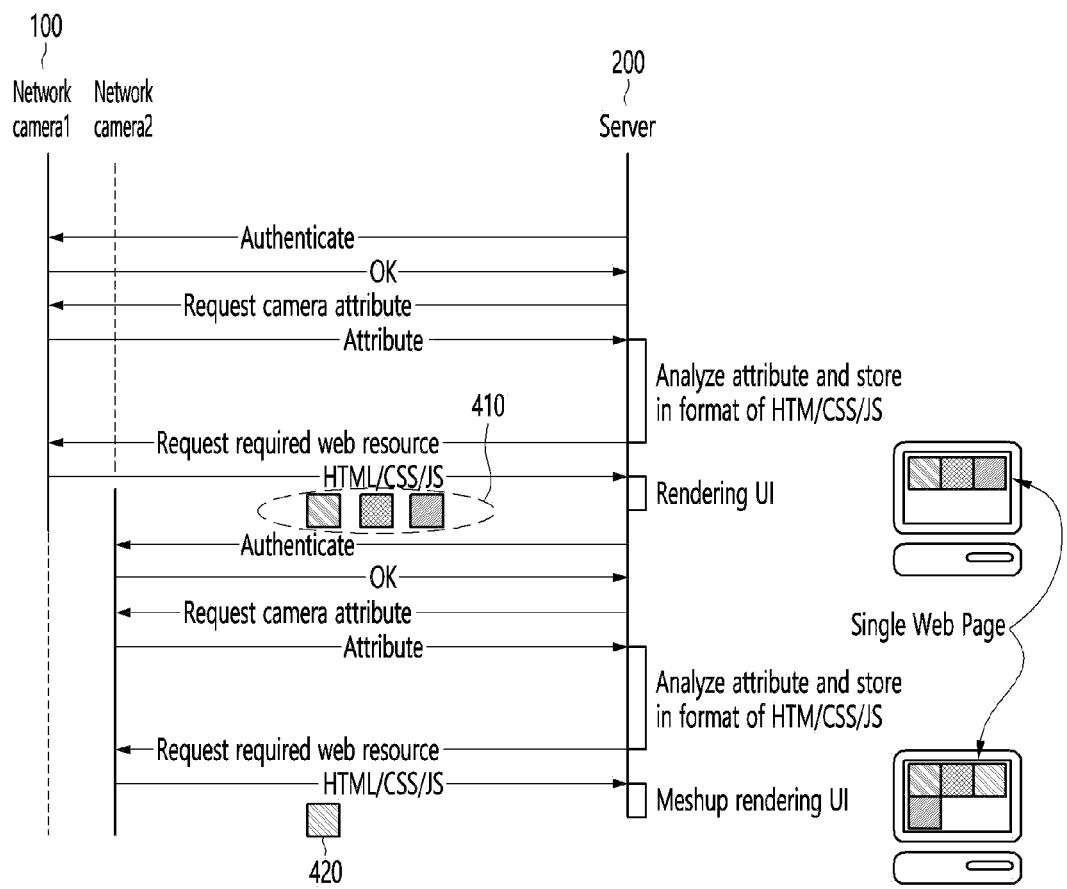
FIG. 4 is a flowchart illustrating an example of a method for performing a web UI setting for a plurality of surveillance cameras through one setting page of a server web browser proposed in the present disclosure.

FIG. 4 is a flowchart illustrating an example of a method for performing a web UI setting for a plurality of surveillance cameras through one setting page of a server web browser proposed in the present disclosure.

FIG. 4 illustrates a process of performing a setting for two surveillance cameras (or network cameras) in one page of a server web browser.

Referring to FIG. 4, the server connects to each of the surveillance camera 1 and the surveillance camera 2 and performs an authentication procedure with the surveillance camera 1 and the surveillance camera 2.

The authentication procedure includes a process of transmitting and receiving an authentication request message and a response message to the authentication request message between the server and each surveillance camera.

The response message may be authentication acceptance (e.g., OK) or authentication rejection (e.g., reject), and FIG. 4 illustrates the case of authentication acceptance.

For the authenticated surveillance cameras, the server requests a camera attribute from the surveillance camera.

Then, each surveillance camera transmits information on its own camera attribute in xml format to the server in response to the request for the camera attribute.

Here, the server may store the received attribute in the form of xml as HTML, CSS, or JS.

Then, the server analyzes the information on the camera attribute received from each surveillance camera, and stores the camera attribute in the xml format in the memory in the format of HTML, CSS, JS, etc.

Then, the server checks whether the UI web resource for the received camera attribute is stored in the memory.

As a result of the checking, when all UI web resources for the received camera attributes are stored, the server configures a web UI for the surveillance camera based on the UI web resource.

Or, if the UI web resource for the received camera attribute is not stored, the server requests an unstored UI web source, among camera setting UI web resource corresponding to an item in which "Yes (or true)" is set or displayed in the received camera attribute, from the surveillance camera.

Thereafter, the server mashes up and renders a web setting UI for controlling and managing the setting for a plurality of surveillance cameras based on the UI web resource received from the surveillance camera.

In FIG. 4, a UI web resource corresponding to four camera attributes is not stored in the server, three camera attributes 410 correspond to the camera attribute common to the surveillance camera 1 and the surveillance camera 2, the server configures and outputs a UI by requesting and receiving a common camera attribute through the surveillance camera 1, one camera attribute 420 corresponds to only the surveillance camera 2, and the server configures a web UI by requesting and receiving an individual camera attribute through the surveillance camera 2, mashes up with the UI configured by the common camera attribute and renders the same.

The above steps may be sequentially performed for each surveillance camera or may be performed simultaneously.

Figure 5:
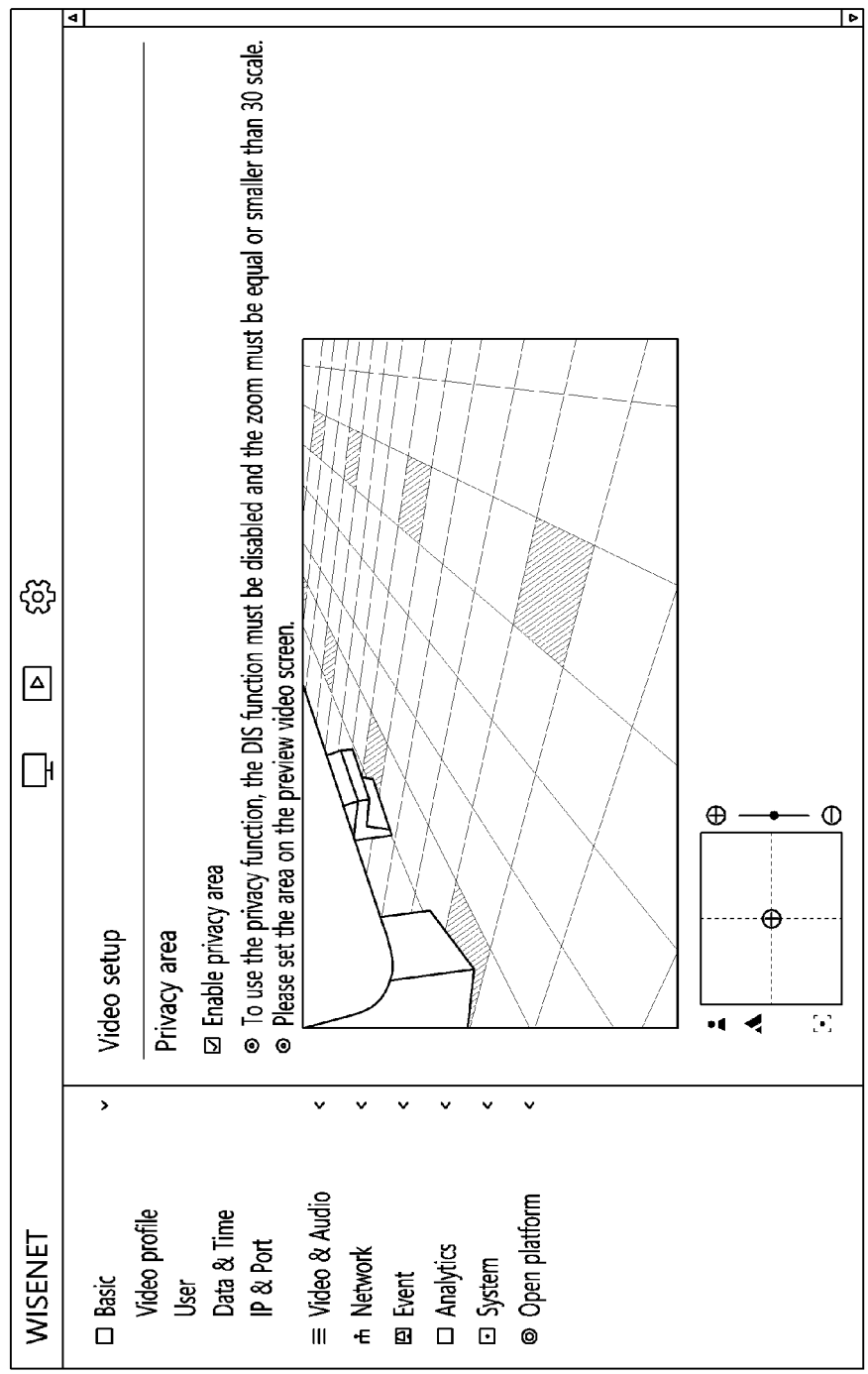
FIGS. 5 and 6 are diagrams illustrating an example of a web UI screen for a surveillance camera setting output to a server web browser proposed in the present disclosure.
Figure 6:
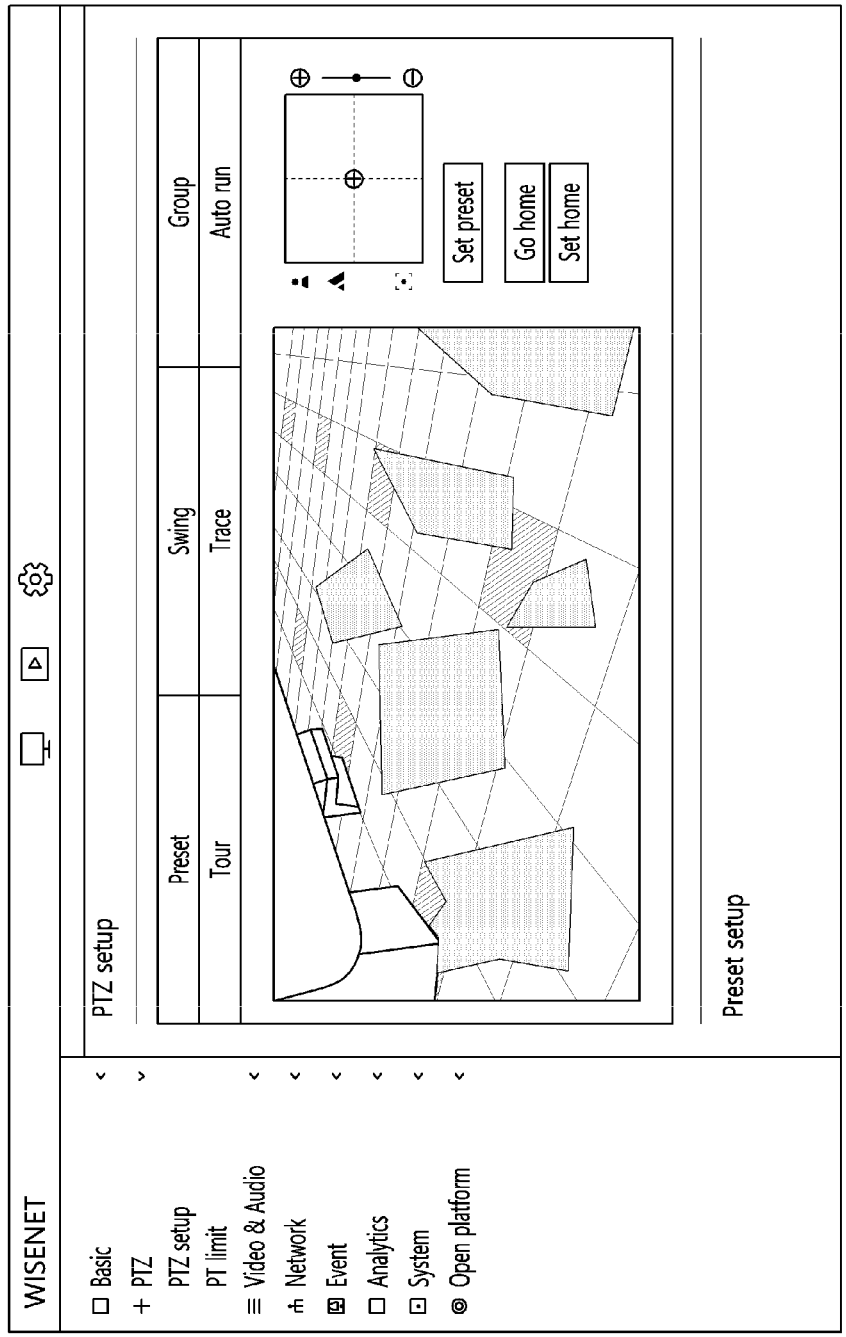

FIGS. 5 and 6 are diagrams illustrating an example of a web UI screen for a surveillance camera setting output to the server web browser proposed in the present disclosure.

FIG. 5 illustrates an example of a web UI screen for setting a surveillance camera output on one page of a server web browser, and FIG. 6 is a web UI screen for a surveillance camera output on one page of a server web browser obtained by mashing up a web UI of a surveillance camera having a PTZ function in addition to the web UI for setting the surveillance camera of FIG. 5 with the web UI of FIG. 5 through an individual setting and rendering.

Figure 7:
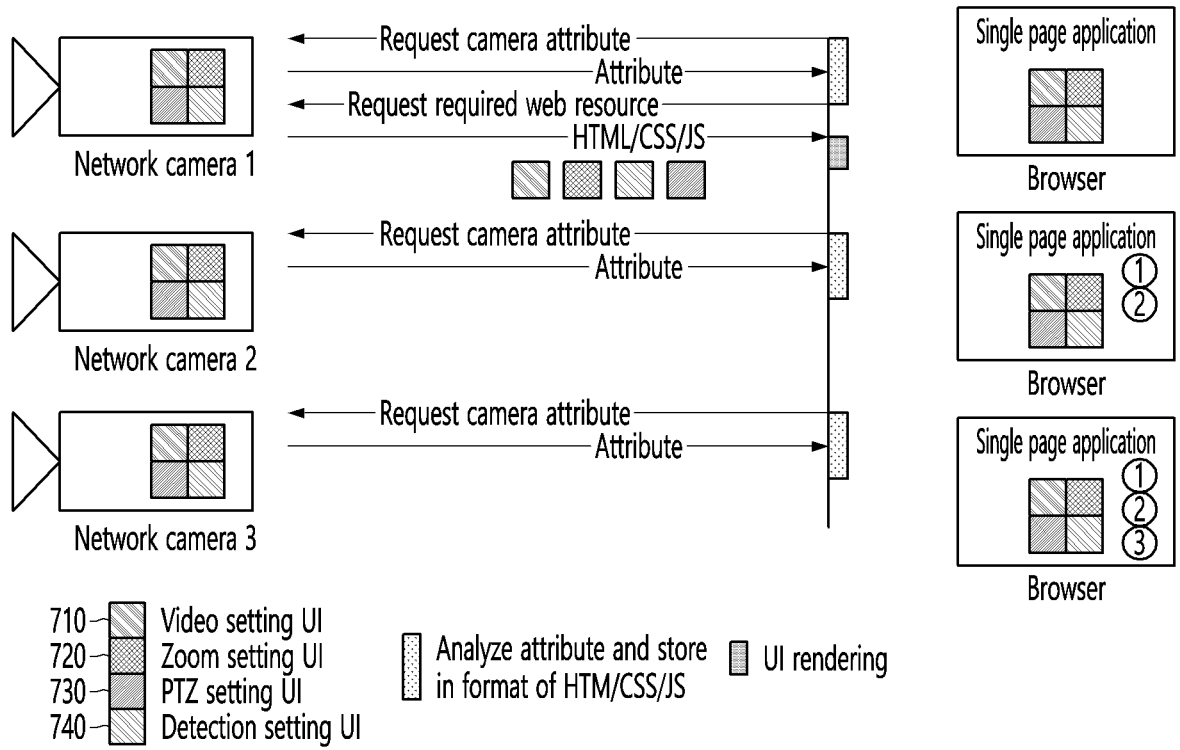
FIG. 7 is a flowchart illustrating another example of a method for performing a web UI setting for a plurality of surveillance cameras through one setting page of a server web browser proposed in the present disclosure.

FIG. 7 is a flowchart illustrating another example of a method for performing a web UI setting for a plurality of surveillance cameras through one setting page of a server web browser proposed in the present disclosure.

That is, FIG. 7 illustrates a process of rendering by mashing up a web UI setting for three surveillance cameras of the same model (having the same camera attribute) on one page of a server web browser.

Since the surveillance cameras of the same model have the same camera attribute, when the UI web resource corresponding to the camera attribute received from the surveillance camera is not stored in the memory, the server requests the UI web resource from any one surveillance camera and does not request the UI web resource for the rest of the surveillance cameras.

However, even the same surveillance camera may have a different web UI setting depending on an environment in which the surveillance camera is installed. For example, it is assumed that there are three identical surveillance cameras (surveillance camera #1, surveillance camera #2, and surveillance camera #3).

If surveillance camera 3 is installed indoors and a different web UI setting from surveillance camera 1 and 2 is required, when control for the surveillance camera 3 is set by clicking a specific button (e.g., button 3) corresponding to surveillance camera 3 (by the user) in one web page of the server web browser, the corresponding setting may be applied only to camera 3.

If the specific button corresponding to surveillance camera 3 is not clicked or selected (by the user), the value set in one web page of the server web browser (or common setting value) may be applied equally to all surveillance cameras.

Referring to FIG. 7, it can be seen that three surveillance cameras of the same model have the same camera attribute for video setting, zoom setting, PTZ setting, and detection setting.

The server requests information on the camera attribute for each surveillance camera, check whether the UI web resource corresponding to the item set or displayed as "true" among the attribute information (xml format) received from each surveillance camera is stored in the memory of the server, and request the UI web resource that is not stored in the memory from the surveillance camera.

In the case of FIG. 7, it can be seen that the server does not store UI web resources for four UI web resources, that is, video setting/zoom setting/PTZ setting/detection setting 710, 720, 730, and 740 for each surveillance camera. However, since the surveillance cameras are all surveillance cameras having the same attribute, the server may request the four UI web resources only for a surveillance camera connected first and render the received four UI web resources to the output unit of the server.

Figure 8:
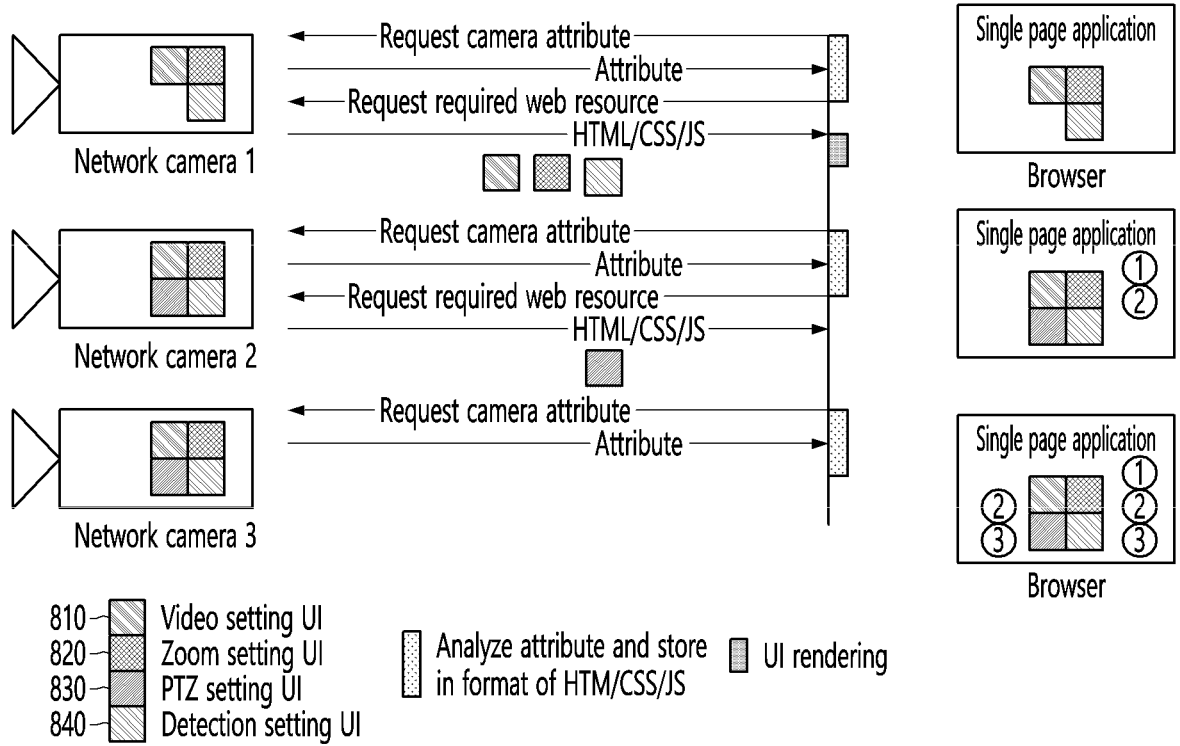
FIG. 8 is a flowchart illustrating another example of a method for performing a web UI setting for a plurality of surveillance cameras through one setting page of the server web browser proposed in the present disclosure.

FIG. 8 is a flowchart illustrating another example of a method for performing a web UI setting for a plurality of surveillance cameras through one setting page of the server web browser proposed in the present disclosure.

That is, FIG. 8 illustrates a process of rendering by mashing up a web UI setting of one surveillance camera of a model different from that of the two surveillance cameras of the same model to one page of the server web browser.

In the case of FIG. 8, it is assumed that the server is connected to three surveillance cameras, surveillance camera 2 and surveillance camera 3 are the same model, and surveillance camera 1 is a different model. Three surveillance cameras have three camera attributes (video setting, zoom setting and detection setting) 810, 820, and 840 in common, and surveillance cameras 2 and 3 additionally have one camera attribute (PTZ setting) (830).

That is, the web UI setting for the camera attribute common to the three surveillance cameras is performed, for example, through the connected surveillance camera 1, and a setting for the camera attribute for the surveillance cameras 2 and 3 of different models from the surveillance camera 1 may be performed as an individual setting.

In addition, the web UI configured for the surveillance cameras 2 and 3 may be mashed up with the web UI configured for the first surveillance camera and rendered.

Each process of FIG. 8 will be described in more detail.

First, the server requests a camera attribute from each surveillance camera.

The server checks whether the UI web resource corresponding to the received camera attribute is stored in the memory based on the camera attribute (which may be in the form of xml) received from each surveillance camera, and if it is not stored, the server requests the UI web resource from a surveillance camera. In the case of FIG. 8, it is assumed that the server does not store UI web resources related to video setting, zoom setting, PTZ setting, and detection setting (810 to 840).

Thereafter, the UI web resource for the video setting, zoom setting and detection setting (810, 820, and 840) is a setting common to three surveillance cameras, and the server may request and receive the three UI web resources from, for example, the surveillance camera 1 connected first.

In addition, the server may request and receive the UI web resource related to the PTZ setting 830 that the surveillance cameras 2 and 3 additionally have from the surveillance camera 2 that is connected first.

Also, the server mashes up the common web UI configured by the UI web resource received from the surveillance camera 1 and the individual web UI configured by the UI web resource received from the surveillance camera 2 and render them to the output unit of the server.

Second Embodiment

Next, a method for configuring a web UI in one web page of a server web browser for setting of a plurality of IoT devices proposed in the present disclosure and performing setting control for the plurality of IoT devices therethrough will be described.

That is, the web UI setting method for controlling a setting of a plurality of surveillance cameras on one page of the server web browser proposed in the present disclosure may be equally applied to IoT devices of home, companies, factories such as smart home, IoT systems, as well as a surveillance camera in a video surveillance system.

For example, in order to control devices having IoT functions such as washing machines, TVs, and vacuum cleaners (hereinafter referred to as "IoT devices") in the home, a common setting web UI and an individual setting web UI may be mashed up and rendered to one page of the server web browser, thereby performing a setting for a plurality of IoT devices through the common setting part and the individual setting part.

The server may include a mobile phone, a laptop computer, etc. carried by the user.

Table 2 below illustrates an example of attribute (e.g., xml format) information included in each IoT device according to the type of IoT device. By mashing up the common web UI for device attributes (power setting, reservation setting, operation time setting, failure notification setting, remote setting, operation strength setting, etc.) common to washing machines, TVs, and cleaners and the individual web UI for device attributes (rinse/drying setting, volume setting, home position setting) individual to each IoT device and rendering to the server, the setting control for the plurality of IoT devices may be simplified.

TABLE 2

| | IoT device | | |
| --- | --- | --- | --- |
| | Washing machine | TV | Cleaner |
| Power setting | ○ | ○ | ○ |
| Reservation setting | ○ | ○ | ○ |
| Operation time setting | ○ | ○ | ○ |
| Failure notification setting | ○ | ○ | ○ |
| Remote controller setting | ○ | ○ | ○ |
| Rinse/drying setting | ○ | X | X |
| Volume setting | X | ○ | X |
| Operation strength setting | ○ | X | ○ |
| Home position setting | X | X | ○ |

Table 2 illustrates an example of IoT devices existing in a home, which may also be equally applied to IoT devices existing in a company or a factory.

Figure 9:
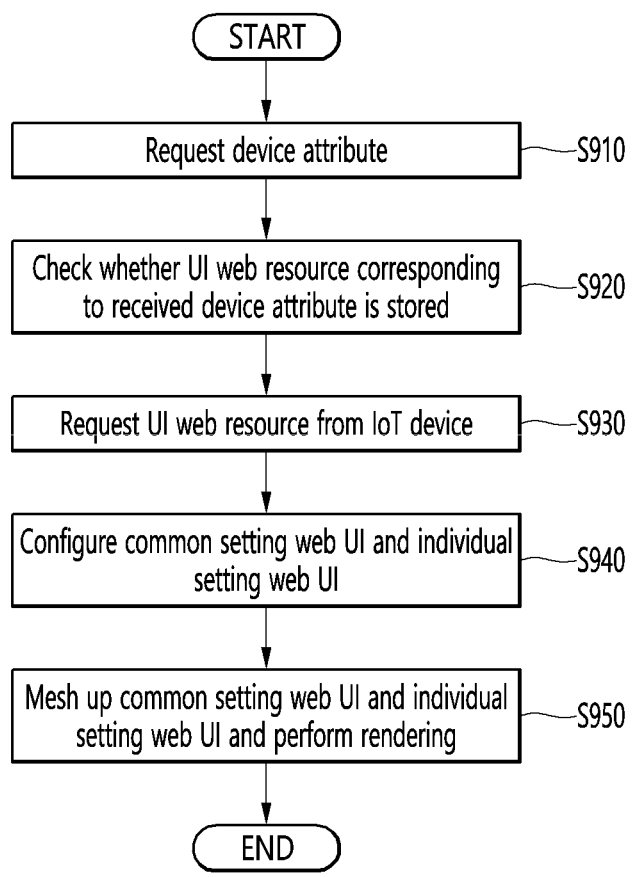
FIG. 9 is a flowchart illustrating an example of a method for controlling a setting for a plurality of IoT devices in one page of a server web browser proposed in the present disclosure.

FIG. 9 is a flowchart illustrating an example of a method for controlling a setting for a plurality of IoT devices in one page of a server web browser proposed in the present disclosure.

FIG. 9 will be described with reference to Table 2 above, and the server used in FIG. 9 may include a mobile phone, a laptop computer, etc. carried by the user.

First, the server requests a device attribute from each IoT device (S910).

The server checks whether a UI web resource corresponding to the received device attribute is stored in the memory based on the device attribute (which may be in the form of xml) received from each IoT device (refer to Table 2) (S920).

As a result of the checking, if the UI web resource corresponding to the received device attribute is not stored in the memory, the server requests the UI web resource from the IoT device (S930).

Thereafter, the server configures a common setting web UI for the same device attribute and configures an individual setting web UI for different device attributes (S940).

Here, the server may request and receive a UI web resource related to a common setting from any one IoT device among IoT devices having the same device attribute in order to configure a common setting web UI.

In addition, the server may request and receive a UI web resource related to individual setting from each IoT device to configure the individual setting web UI.

In addition, the server may mash up the common web UI configured by the UI web resource related to the common setting and the individual web UI configured by the UI web resource related to the individual setting and render the same to the output unit of the server (S950).

Figure 10:
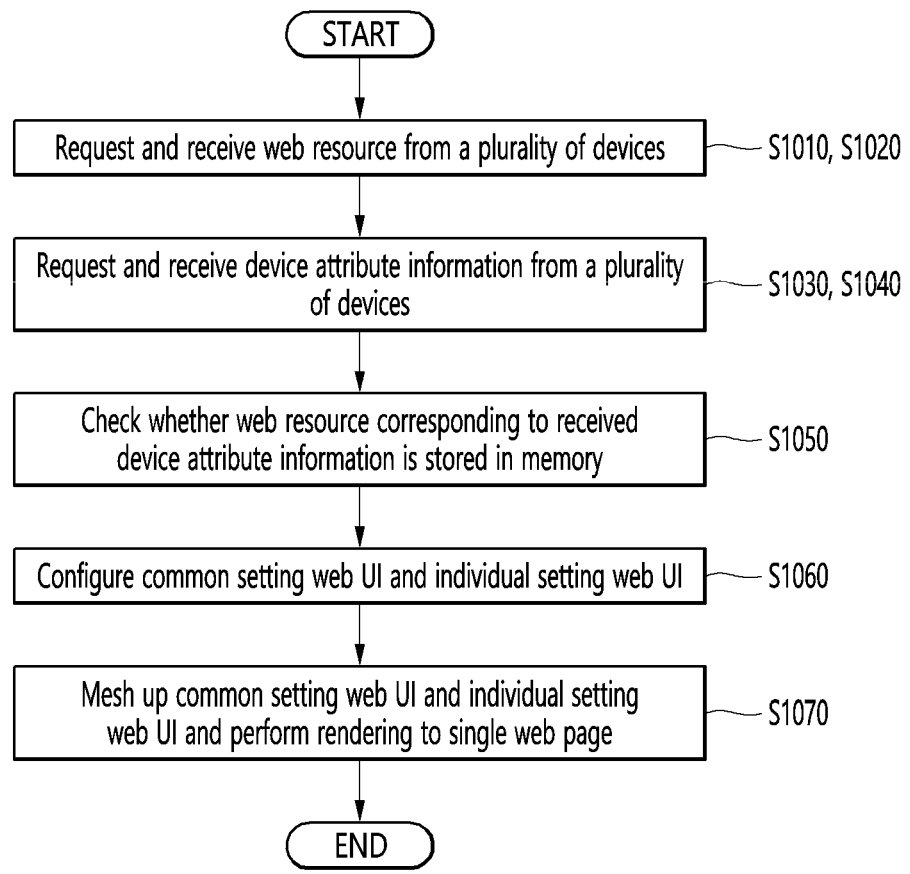
FIG. 10 is a flowchart illustrating an example of a web UI setting method proposed in the present disclosure.

FIG. 10 is a flowchart illustrating an example of a web UI setting method proposed in the present disclosure.

That is, FIG. 10 relates to a method for performing setting control for a plurality of devices through a web UI of a server.

First, the server requests a web resource from the plurality of devices to set a web UI for the plurality of devices (S1010).

Also, the server receives the web resource from the plurality of devices (S1020).

Also, the server requests device attribute information related to a device attribute from the plurality of devices (S1030).

Here, a format of the device attribute information may be xml, and a format of the web resource may be hypertext markup language (HTML), cascading style sheets (CSS), or JavaScript (JS).

Also, the server receives the device attribute information from the plurality of devices (S1040).

Then, the server checks whether the web resource corresponding to the received device attribute information is stored in the memory of the server (S1050).

Here, as a result of the checking, when the web resource corresponding to the received device attribute information is not stored in the memory of the server, the server requests a web resource corresponding to the received device attribute information from a device having the received device attribute information, and receives the requested web resource from the device having the received device attribute information.

Here, as a result of the checking, if the web resource corresponding to the received device attribute information is stored in the memory of the server, the server performs step S1060.

Also, the server configures a common setting web UI for common device attributes for a common device attribute and an individual setting web UI for an individual device attribute based on the web resource (S1060).

Also, the server mashes up the common setting web UI and the individual setting web UI and renders the same to a single web page of the server (S1070).

Additionally, the server may further perform an authentication procedure with the plurality of devices.

Here, the plurality of devices may be a plurality of surveillance cameras, and the device attribute may include at least one of a video setting, a zoom setting, a PTZ setting, and a detection setting.

Alternatively, the plurality of devices may be IoT devices.

Figure 11:
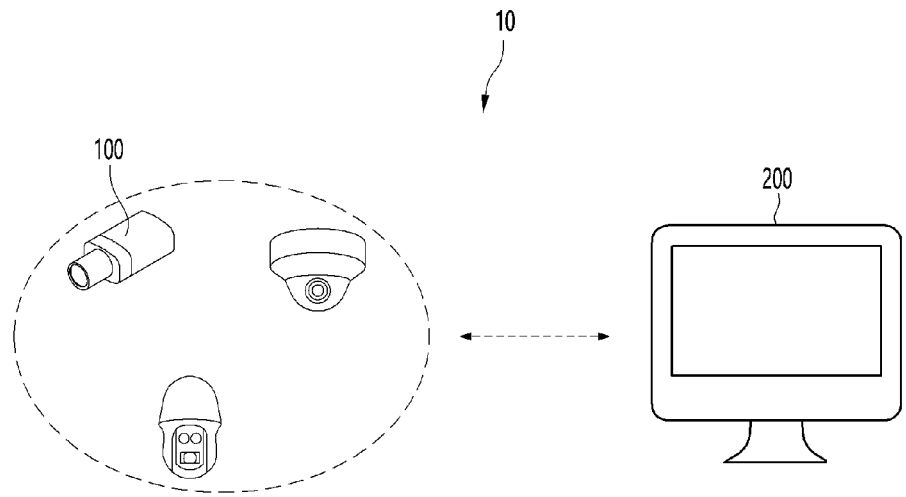
FIG. 11 illustrates an example of a conceptual diagram of a video surveillance system to which a web UI setting method proposed in the present disclosure may be applied.
Figure 12:
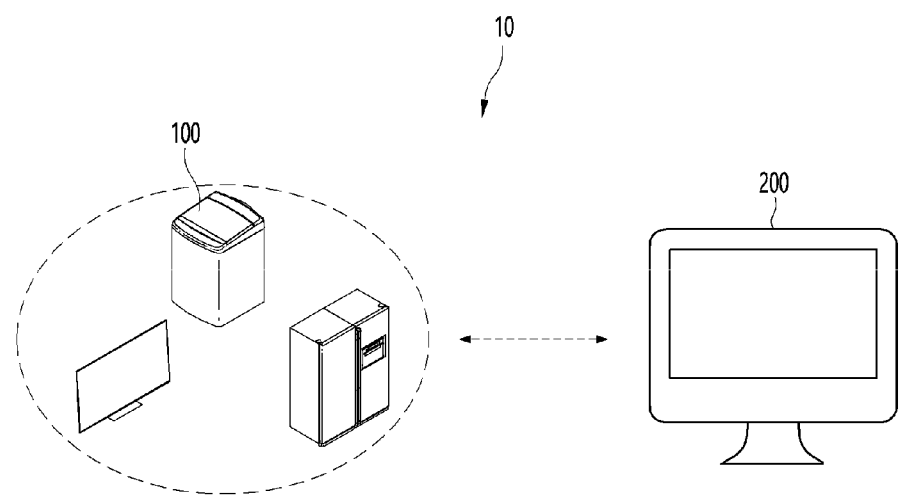
FIG. 12 illustrates an example of a conceptual diagram of an IoT system to which a web UI setting method proposed in the present disclosure may be applied.

FIG. 11 illustrates an example of a conceptual diagram of a video surveillance system to which a web UI setting method proposed in the present disclosure may be applied, and FIG. 12 illustrates an example of a conceptual diagram of an IoT system to which a web UI setting method proposed in the present disclosure may be applied.

Referring to FIG. 11, a video surveillance system 10 proposed in the present disclosure may include a plurality of surveillance cameras 100 and a server 200. The surveillance camera may be expressed as a network camera, a video camera, a CCTV, or the like.

The plurality of surveillance cameras and the server may be connected by wire and/or wirelessly.

The server displays a web UI for controlling the setting for the plurality of surveillance cameras on the output unit, and when a control or setting input for at least one surveillance camera is received from the user through the web UI displayed on the output unit, the server performs control on the at least one surveillance camera based on the received user input. That is, the at least one surveillance camera may change a preset camera setting based on a control command received by the server.

Here, the web UI screen output on the server is a screen in which a common setting web UI and an individual setting web UI for a plurality of surveillance cameras are mashed up and rendered, and a common setting part for a plurality of surveillance cameras may control a plurality of surveillance cameras having a common setting part through one time of setting.

Referring to FIG. 12, the IoT system 10 proposed in the present disclosure may be configured to include a plurality of home appliances 100 and a server 200. The plurality of home appliances may include a washing machine, a TV, a vacuum cleaner, and the like, and may have an IoT function capable of communicating with a server.

In the case of FIG. 12, a home appliance having an IoT function is exemplified, but the present disclosure is not limited to the home appliance and may be applied to an IoT device in a factory or a company. In addition, the server may include a mobile phone, a laptop computer, etc. carried by the user.

The plurality of home appliances and the server may be connected by wire and/or wirelessly.

The server displays a web UI for controlling the setting for the plurality of home appliances on the output unit, and when a control or setting input for at least one home appliance is received from the user through the web UI displayed on the output unit, the server performs control on the at least one home appliance based on the received user input. That is, the at least one home appliance may change a preset camera setting based on a control command received by the server.

Here, the web UI screen output on the server is a screen in which a common setting web UI and an individual setting web UI for a plurality of home appliances are mashed up and rendered, and a common setting part for a plurality of home appliances may control a plurality of home appliances having a common setting part through one time of setting.

Internal Block Diagram of Device

Figure 13:
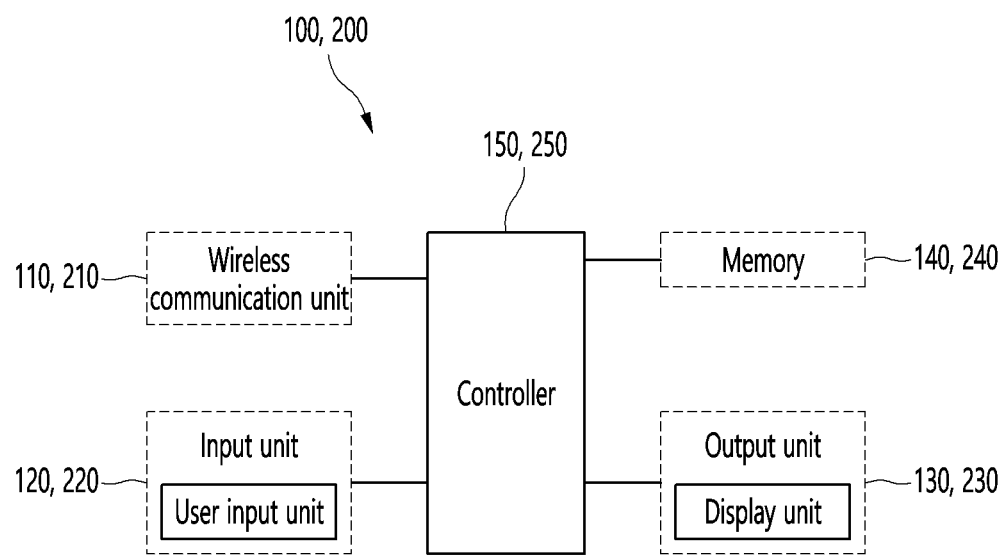
FIG. 13 is an internal block diagram illustrating a device to which the method proposed in the present disclosure may be applied.

FIG. 13 is an internal block diagram illustrating a device to which a method proposed in the present disclosure may be applied.

The device described in FIG. 13 may be a concept including a surveillance camera, an IoT device, a server, and the like.

The devices 100 and 200 may include wireless communication units 110 and 210, input units 120 and 220, output units 130 and 230, memories 140 and 240, and controllers 150 and 250, and the like. The components shown in FIG. 13 are not essential for implementing the terminal, so the terminal described in the present disclosure may have more or fewer components than those listed above.

More specifically, the wireless communication unit among the components may include one or more modules that enable wireless communication between the device and a wireless communication system, between the device and another device, or between the device and a server. In addition, the wireless communication unit may include one or more modules connecting the device to one or more networks.

The wireless communication unit may include at least one of a mobile communication module, a short-range communication module, and a location information module.

The input unit may include a user input unit (e.g., a touch key, a mechanical key, etc.) for receiving information from the user. The input unit may further include a camera or an image input unit for inputting an image signal, a microphone for inputting an audio signal, or an audio input unit. Voice data or image data collected by the input unit may be analyzed and processed as a user's control command.

The output unit is for generating an output related to visual, auditory or tactile sense, and may include at least one of a display unit, an audio output unit, a haptip module, and an optical output unit. The display unit may form an interlayer structure with a touch sensor or integrally formed with a touch sensor to implement a touch screen. Such a touch screen may function as a user input unit providing an input interface between the device and the user, and may provide an output interface between the device and the user.

In addition, the memory stores data supporting various functions of the device. The memory may store a plurality of application programs (application programs or applications) running in the device, data for operation of the device, and commands. At least some of these application programs may be downloaded from an external server through wireless communication. In addition, at least some of these application programs may exist on the device from the time of releasing for basic functions (e.g., incoming calls, outgoing functions, message reception, and outgoing functions) of the device. Meanwhile, the application program may be stored in a memory, installed on the device, and driven to perform an operation (or function) of the device by the controller.

In addition to the operation related to the application program, the controller generally controls an overall operation of the device. The controller may provide or process appropriate information or functions to the user by processing signals, data, information, etc. input or output through the aforementioned components or by driving an application program stored in a memory.

In addition, the controller may control at least some of the components described with reference to FIG. 13 in order to drive an application program stored in the memory. Furthermore, in order to drive the application program, the controller may operate at least two or more of the components included in the device in combination with each other.

At least some of the respective components may operate in cooperation with each other to implement an operation, control, or control method for a terminal according to various embodiments to be described below. Also, the operation, control, or control method for the device may be implemented on the device by driving at least one application program stored in the memory.

The embodiments described above are combinations of elements and features of the present disclosure in a predetermined form. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It will be obvious that claims that do not explicitly cite each other in the appended claims may be presented in combination as an exemplary embodiment of the present disclosure or included as a new claim by subsequent amendment after the application is filed.

The embodiment according to the present disclosure may be implemented by various means, for example, hardware, firmware, software, or a combination thereof. For implementation by hardware, an embodiment of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

In the case of implementations by firmware or software, an embodiment of the present disclosure may be implemented in the form of a module, procedure, or function for performing the aforementioned functions or operations. Software code may be stored in the memory and driven by the processor. The memory may be placed inside or outside the processor, and may exchange data with the processor through a variety of known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the invention should be determined by the appended claims and their legal equivalents, not by the above description and all changes coming within the meaning and equivalency range of the appended claims are intended to be embraced therein.

DETAILED DESCRIPTION OF MAIN ELEMENTS

100: device 200: server

What is claimed is:

1. A method for performing setting control for a plurality of surveillance cameras through a web UI (user interface) of a server, the method comprising:
    requesting a web resource from the plurality of surveillance cameras for setting the web UI for the plurality of surveillance cameras;
    receiving the web resource from the plurality of surveillance cameras;
    requesting device attribute information related to a device attribute (50) from the plurality of surveillance cameras; receiving the device attribute information from the plurality of surveillance cameras;
    checking whether the web resource corresponding to the received device attribute information is stored in a memory of the server;
    configuring a common setting web UI for a common camera attribute (410) and configuring an individual setting web UI for an individual camera attribute (420) based on the web resource; and
    mashing up the common setting web UI and the individual setting web UI and rendering the mashed common setting web UI and individual setting web UI to a single web page of the server.

2. The method for claim 1, further comprising:
    requesting the web resource corresponding to the received device attribute information from a camera having the received device attribute information as the web resource corresponding to the received device attribute information is not stored in the memory of the server as a result of the checking; and
    receiving the requested web resource from the camera having the received device attribute information.

3. The method for claim 1, wherein a format of the received device attribute information is xml, and a format of the web resource is hypertext markup language (HTML), cascading style sheets (CSS), or JavaScript (JS).

4. The method for claim 1, further comprising performing an authentication procedure with the plurality of cameras.

5. The method for claim 1, wherein the device attribute includes at least one of a video setting, a zoom setting, a PTZ setting, and a detection setting.

6. A server (200) for performing setting control for a plurality of devices (100), the server comprising:
    a wireless communication unit (210) transmitting and receiving wireless signals;
    a memory (240);
    an output unit (230);
    a controller (250) functionally connected to the wireless communication unit (210), the memory and the output unit (230);
    the controller (250) controlling the wireless communication unit (210) to request a web resource from the plurality of devices (100) for web UI setting regarding the plurality of devices (100) and receive the web resource from the plurality of devices (100);
    the controller (250) controlling the wireless communication unit to request device attribute information related to a device attribute from the plurality of devices (100) and receive the device attribute information from the plurality of devices (100);
    the controller (250) checking whether the web resource corresponding to the received device attribute information is stored in the memory of the server;
    the controller (250) configuring a common setting web UI for a common device attribute (410) and an individual setting web UI for an individual device attribute (420) based on the web resources; and
    the controller (250) controlling the output unit to mash up the common setting web UI and the individual setting web UI and render to a single web page of the server.

7. The server of claim 6, wherein,
    when the web resource corresponding to the received device attribute information is not stored in the memory of the server, the controller requests the web resource corresponding to the received device attribute information from a device having the received device attribute information and controls the wireless communication unit to receive the requested web resource from the device having the received device attribute information.

8. A server (200) for performing setting control for a plurality of devices (100), the server (200) comprising:
    a wireless communication unit (210) transmitting and receiving wireless signals;
    a memory (240);
    an output unit (230);
    a controller (250) functionally connected to the wireless communication unit (210), the memory and the output unit (230);
    the controller (250) controlling the wireless communication unit (210) to request a web resource from the plurality of devices (100) to perform web UI setting for the plurality of devices (100) and receive the web resource from the plurality of devices (100);
    the controller (250) controlling the wireless communication unit to request device attribute information related to a device attribute of the plurality of devices from the plurality of devices (100) to perform the web UI setting (40) related to the device attribute and receive the device attribute information from the plurality of devices (100);
    the controller (250) determining whether the device attribute is a common device attribute (410) or an individual device attribute (420), to perform the web UI setting related to the device attribute for the plurality of devices (100);
    the controller (250) checking whether the web resource corresponding to the received device attribute information is stored in the memory (240) of the server (200), to perform the web UI setting related to the device attribute for the plurality of devices (100);
    the controller (250) configuring a common setting web UI for a common device attribute (410) and an individual setting web UI for an individual device attribute (420)

based on the web resources, to perform the web UI setting related to the device attribute for the plurality of devices (100);

the controller (110) controlling the output unit to mash up the common setting web UI and the individual setting web UI and render to a single web page or a single page application (SPA) of the server; and the controller determining whether the device attribute of each of the plurality of devices (100) is present or not present.

9. The server of claim 6, wherein the device attribute includes at least one of a video setting, a zoom setting, a PTZ setting, and a detection setting.

10. The server of claim 8, wherein the device attribute includes at least one of a video setting, a zoom setting, a PTZ setting, and a detection setting.

* * * * *